United States Patent [19]

Soeda et al.

[11] Patent Number: 5,200,729
[45] Date of Patent: Apr. 6, 1993

[54] PERMANENT MAGNET AND MAGNETIZATION APPARATUS FOR PRODUCING THE PERMANENT MAGNET

[75] Inventors: Katsuji Soeda; Shuzo Otsuki; Masaru Wada, all of Sukagawa, Japan

[73] Assignee: Yamamoto Electric Corporation, Sukagawa, Japan

[21] Appl. No.: 479,301

[22] Filed: Feb. 7, 1990

[30] Foreign Application Priority Data

Aug. 29, 1989 [JP] Japan .............................. 1-222730
Nov. 1, 1989 [JP] Japan .............................. 1-285546

[51] Int. Cl.$^5$ ........................ H01F 7/20; H01F 13/00
[52] U.S. Cl. .................................................... 335/284
[58] Field of Search ................... 335/284, 302, 245; 361/143; 310/154, 156, 172

[56] References Cited

U.S. PATENT DOCUMENTS

| | | | |
|---|---|---|---|
| 3,270,264 | 8/1966 | Miner | 310/172 |
| 4,494,028 | 1/1985 | Brown | 335/284 |
| 4,614,929 | 9/1986 | Tsukuda et al. | 335/284 |
| 4,806,837 | 12/1989 | Ito | 335/272 |

Primary Examiner—Leo P. Picard
Assistant Examiner—Raymond Barrera
Attorney, Agent, or Firm—Nikaido, Marmelstein, Murray & Oram

[57] ABSTRACT

Disclosed is a permanent magnet which is suitable for use for a field system of an electric motor or the like and which is constituted by a single piece of magnetic material in which S and N poles are alternately continuously formed through non-magnetic flux regions or weak magnetic flux regions interposed therebetween, and further disclosed is a magnetization apparatus for magnetizing such a permanent magnet. The magnetization apparatus comprises a first magnetic flux generation unit provided on one surface of a single piece of magnetic material for generating N-pole magnetic flux, a second magnetic flux generation unit provided adjacently to the first magnetic flux generation unit on the one surface for generating S-pole magnetic flux, and a third magnetic flux generation unit provided between the first and second magnetic flux generation unit on the one surface for passing therethrough part of magnetic flux generated by the first and second magnetic flux generation unit and for generating magnetic flux for canceling the magnetic flux passing through the third magnetic flux generation unit, whereby N and S poles are formed in domains of an object to be magnetized opposite to the first and second magnetic flux generation units and non-magnetic flux regions or weak magnetic flux regions are formed in domains of the object to be magnetized opposite to the third magnetic flux generation unit.

8 Claims, 6 Drawing Sheets

PERMANENT MAGNET AND MAGNETIZATION APPARATUS FOR PRODUCING THE PERMANENT MAGNET

BACKGROUND OF THE INVENTION

The present invention generally relates to a permanent magnet having alternately continuously formed N and S poles and an apparatus for producing such a permanent magnet. The present invention particularly relates to a permanent magnet which has a non-magnetic flux region or a weak magnetic flux region between adjacent poles and which is suitable for use in an armature or a field system of an electric motor, and relates to a magnetization apparatus for producing such a permanent magnet.

Conventionally, an electric motor has been a typical example of an apparatus having a permanent magnet constituted by alternately continuously formed N and S poles. In a DC motor, for example, a cylindrical or disc-like permanent magnet has been used for a field system or an armature of the motor. In this case of the cylindrical or disc-like permanent magnet having, for example, four magnetic poles, those magnetic poles are distributed in such a manner as shown in FIGS. 1A and 1B respectively, with circumferential field intensity as shown in FIG. 2.

Figure 2:
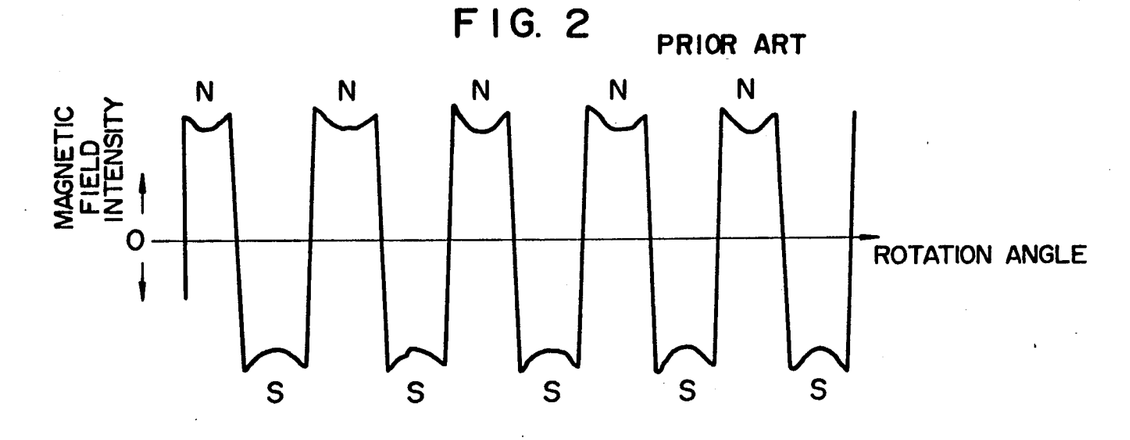
FIG. 2 is a view showing the distribution of the magnetic field intensity in the permanent magnets of FIGS. 1A and 1B.

Since there is no non-magnetic flux region or no weak magnetic flux region provided between adjacent magnetic poles as apparently seen from FIG. 2, it has been difficult to improve the efficiency and characteristics of electric motors.

Figure 1A:
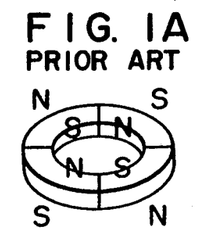
FIGS. 1A and 1B are views showing the conventional permanent magnets.
Figure 1B:
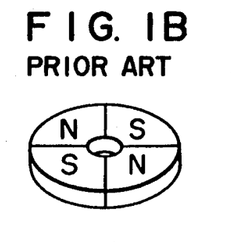
Figures 3A, 3B, 3C:
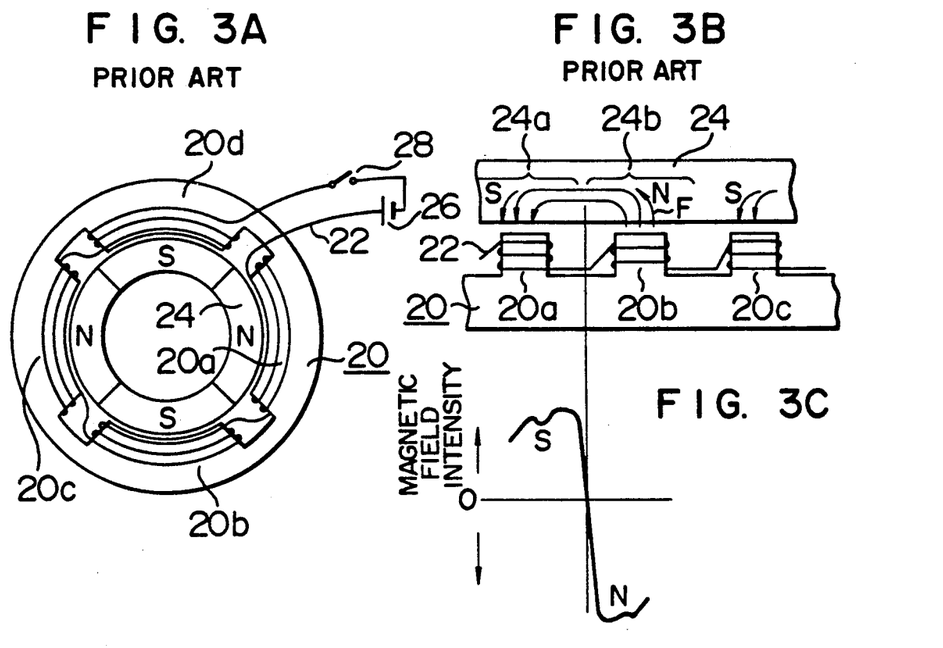
FIGS. 3A, 3B, and 3C are views for explaining a typical example of the magnetization apparatus for producing the conventional permanent magnet.

FIG. 3A shows a typical example of a magnetization apparatus for producing the conventional permanent magnet having four poles as shown in FIG. 1A, and FIG. 3B shows the operation of the magnetization apparatus of FIG. 3A. In FIG. 3A, the magnetization apparatus is constituted by a magnetizing yoke 20 preferably made of a ferromagnetic material and a magnetizing coil 22 connected to a DC power source 26 through a switch 28. The reference numeral 24 designates an object of a magnetic material to be magnetized (hereinafter simply referred to as "magnetized object"), the magnetized object being, for example, cylindrical. The coil 22 is wound around each of projection portions 20a to 20d of the magnetizing yoke 20. A direct current is made to instantaneously flow in the coil 22 so that magnetic flux flows, for example, from the projection portion 20b into the projection portion 20a through the magnetized object 24 as shown in FIG. 3B. As a result, magnetization is performed on the magnetized object 24 in a manner so that S and N poles are formed in regions 24a and 24b of the magnetized object 24 respectively. The field intensity formed by the magnetization is distributed as shown in FIG. 3C. As seen from the drawing, no non-magnetic flux or no weak magnetic flux region exists.

Figure 4A:
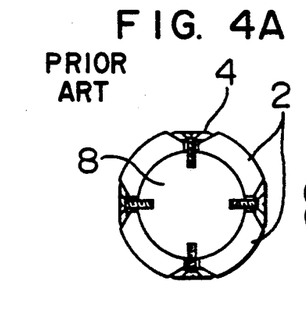
Figure 4B:
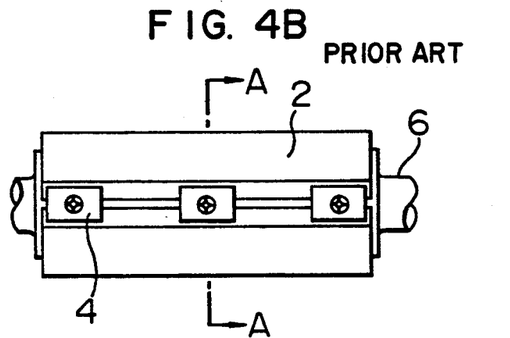

In order to provide a weak magnetic flux region between adjacent poles, therefore, there have been conventionally known such permanent magnets as shown in FIGS. 4A and 4B. FIGS. 5A and 5B and FIGS. 6A and 6B, in which a plurality of permanent magnet pieces separated from each other and each having one pole are stuck to each other through adhesives, metal fittings, or the like.

Figure 5A:
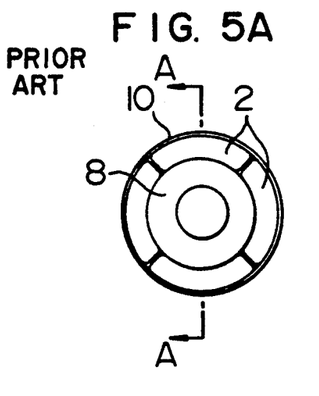
Figure 5B:
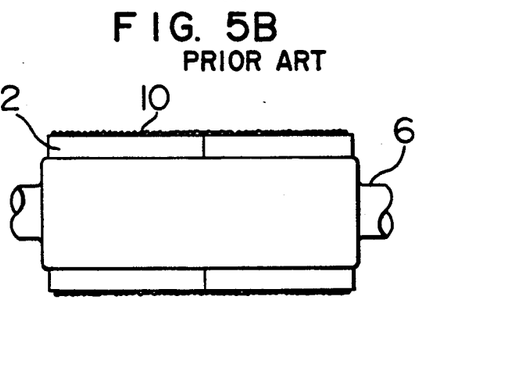
Figure 6A:
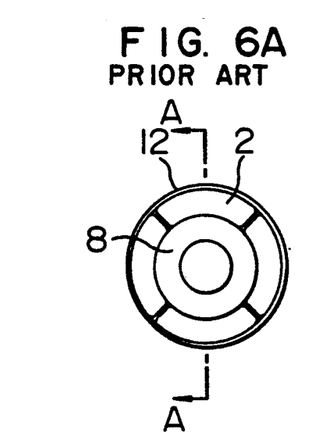
Figure 6B:
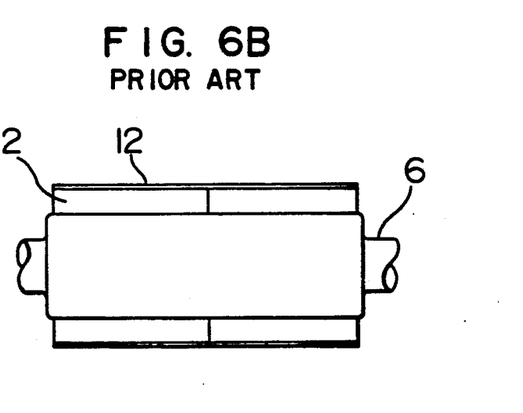

Those permanent magnets constitute armatures of electric motors. FIGS. 4A and 4B show an armature in which permanent magnet pieces are fixed by using pressing metal fittings. FIG. 4A is a cross sectional front view taken on line A—A of the side view of FIG. 4B. In this case, permanent magnet pieces 2 are fixed on a yoke 8 by pressing metal fittings 4 having screw portions. The reference numeral 6 designates a rotary shaft. In this case, although the pressing metal fitting portions form weak magnetic flux regions, there has been a disadvantage in that it is troublesome to fix the permanent magnet pieces by means of the pressing metal fittings so that the working efficiency is poor to thereby increase the cost. FIGS. 5A and 5B and FIGS. 6A and 6B show armatures in which permanent magnet pieces are fixed by a tie wire and a thin stainless steel pipe respectively. FIG. 5B and 6B are cross sectional side views taken on lines A—A of the front views 5A and 6A respectively. In FIGS. 5A and 5B and FIGS. 6A and 6B, permanent magnet pieces 2 are fixed onto yokes 8 by a stainless steel tie wire 10 and a thin stainless steel pipe 12 respectively. In either case, although the stainless steel portions between the magnet pieces form weak magnetic flux regions, there has been a problem in that fixing work is troublesome to thereby increase the cost and in that the magnetic force of the permanent magnet is reduced because of using the tie wire or the pipe and the distance between the armature and a field system is increased because of the thickness of the tie wire or the pipe to thereby further reduce the magnetic force so that the performance of the armature is reduced. Further, there has been possibilities that adhesion portions are deteriorated by time aging or fixing portions are loosened by vibrations to cause such a trouble that permanent magnet pieces come off from the yoke.

SUMMARY OF THE INVENTION

It is a first object of the present invention to eliminate the foregoing disadvantages in the conventional permanent magnets to thereby provide a permanent magnet in which S and N poles ar alternately continuously formed through non-magnetic flux regions or weak magnetic flux regions interposed therebetween and which is excellent in performance, high in reliability, and improved in assembling working efficiency.

It is a second object of the present invention to eliminate the foregoing disadvantages in the conventional magnetization apparatus for producing a permanent magnet to thereby provide a magnetization apparatus for producing a permanent magnet in which S and N poles are alternately continuously provided with non-magnetic flux regions or weak magnetic flux regions interposed therebetween and which is excellent in performance, high in reliability, and improved in assembling working efficiency.

In order to attain the first object, according to the present invention, the permanent magnet is constituted by a single piece of magnetic material in which S and N poles are alternately continuously formed through non-magnetic flux regions or weak magnetic flux regions interposed therebetween. That is, a single piece of magnetic material is magnetized in a manner so that an N pole, a non-magnetic flux (or weak magnetic flux) region and an S pole are alternately continuously formed, whereby the foregoing permanent magnet can be easily inexpensively produced without requiring any complicated assembling work to thereby make it possible to provide permanent magnets which are high in reliability and excellent in performance.

In order to attain the foregoing second object, the magnetization apparatus for magnetizing a permanent magnet according to the present invention comprises: a single piece of magnetic material having a plurality of first and second projection portions of magnetic material integrally formed on one surface of the single piece of magnetic material alternately in one row; a plurality of third projection portions of magnetic material integrally formed on the one surface of the single piece of magnetic material in a manner so that each of the third projection portions is disposed between corresponding two adjacent ones of the first and second projection portions so that the first, second and third projection portions are alternately located; coil unit connected to a DC power source through a switch and continuously serially wound around all of the first and second projection portions; plurality of shorting coils respectively correspondingly wound around the third projection portions; the coil unit wound on the first projection portions and the coil unit wound on the second projection portions being made opposite each other in the direction of winding, so that when an object to be magnetized is disposed in opposition to the one surface of the single piece of magnetic material and the switch is instantaneously closed, one of N and S poles is formed in a domain of the object to be magnetized opposite to each of the first projection portions, the other of N and S poles is formed in a domain of the object to be magnetized opposite to each of the second projection portions, and a non-magnetic flux region or a weak magnetic flux region is formed in a domain of the object to be magnetized opposite to each of the third projection portions. That is magnetic flux of N and S polarities is generated in the first projection portions and magnetic flux of the other polarity is generated in the second projection portions. The magnetic flux generated in the first projection portions passes through the object to be magnetized and at the same time part of the magnetic flux passes through the third projection portions. Accordingly, a current flows in the shorting coils around the third projection portions with a phase delayed by about 90° than a current flowing in the coil means so as to generate magnetic flux for canceling the magnetic flux generated by the first and second projection portions and passing through the third projection portions. That is, the magnetic flux generated by the first and second projection portions and passing through the third projection portions and the magnetic flux generated in the third projection portions are canceled with each other so that only a small quantity of magnetic flux passes through the third projection portions. Therefore, the object to be magnetized can be magnetized by the magnetization apparatus having such a simple configuration in a manner so that an N pole and a non-magnetic flux (weak magnetic flux) region and an S pole are alternately continuously formed. Accordingly, the permanent magnet can be easily inexpensively formed without requiring any complicated assembling work. Thus, it is possible to provide permanent magnets which are high in reliability and excellent in performance.

BRIEF DESCRIPTION OF DRAWINGS

FIGS. 4A through 6B are views for explaining the conventional permanent magnet fixing method used for forming weak magnetic flux regions;

DESCRIPTION OF THE PREFERRED EMBODIMENTS

Embodiments of the permanent magnet and the magnetization apparatus for producing the permanent magnet according to the preset invention will be described in detail with reference to the accompanying drawings hereunder.

Figure 7A:
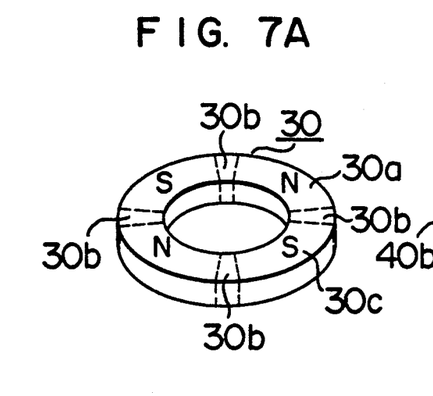
FIGS. 7A and 7B are views showing typical examples of the permanent magnet according to the present invention.
Figure 7B:
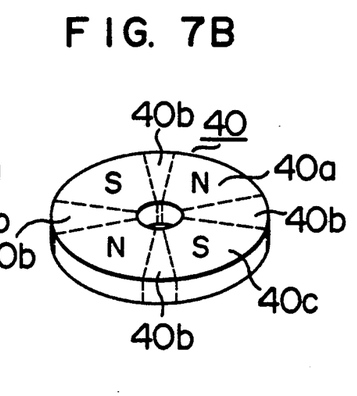
Figure 8A:
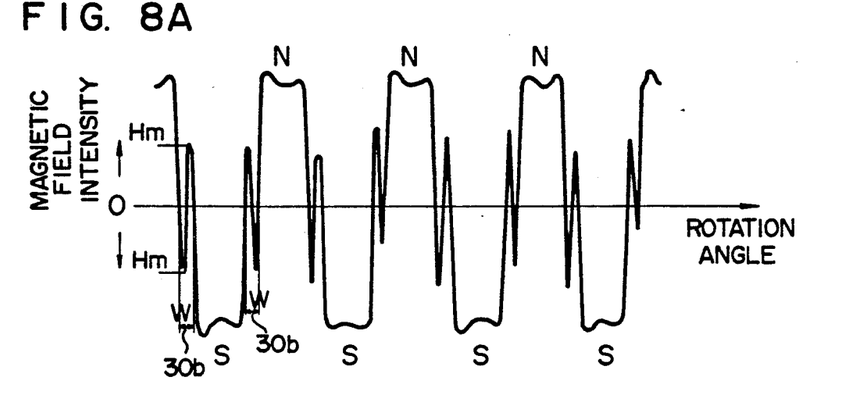
FIGS. 8A to 8C are views showing the distribution of the magnetic field intensity of the permanent magnets of FIGS. 7A and 7B.

FIGS. 7A and 7B show typical examples of the permanent magnet produced by the magnetization apparatus according to the present invention. Those shown in FIGS. 7A and 7B are cylindrical and disc-like four-pole permanent magnets respectively which ar suitable for use in armatures or magnetic field systems of electric motors. The permanent magnet of FIG. 7A is formed of a single piece of magnetic material 30 in a manner so that an N pole 30a, a weak magnetic flux or non-magnetic flux region 30b and an S pole 30c are alternately continuously formed, and the permanent magnet of FIG. 7B is formed of a single piece of magnetic material 40 in a manner so that an N pole 40a, a weak magnetic flux or non-magnetic flux region 40b and an S pole 40c are alternately continuously formed. FIG. 8 shows the distribution of the magnetic field intensity of such a permanent magnet. As seen from the drawing, the non-magnetic flux or weak magnetic flux region 30b is disposed between the N and S poles. Thus, the permanent magnet according to the present invention is suitable to improve the efficiency and characteristics of an electric motor when it is used in a magnetic field system or an armature of the motor because the permanent magnet apparently has non-magnetic flux or weak-magnetic flux regions as described above. Further, it is possible to provide a permanent magnet which requires no assembling work so that the working efficiency is good and which is durable against vibrations in use so that the reliability is high, because the permanent magnet is formed of a single piece of magnetic field.

Figure 9A:
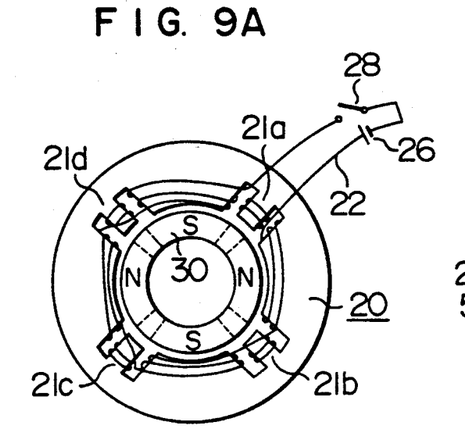
FIGS. 9A and 9B are views showing an embodiment of the magnetization apparatus according to the present invention.
Figure 9B:
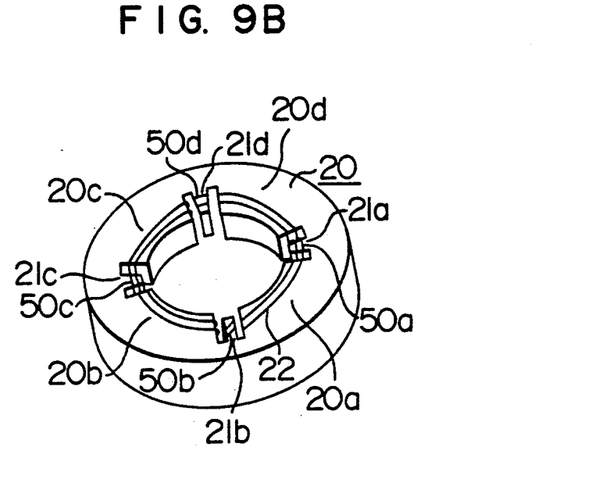

Next, description will be made as to the method of magnetizing the permanent magnet and apparatus for producing such a permanent magnet, according to the present invention. FIG. 9A is a top view showing a typical example of the magnetization apparatus for producing the permanent magnet of FIG. 7A, and FIG. 9B is a perspective view showing the same magnetization apparatus. In the drawings, items having the same functions as those of FIGS. 3A through 3C are correspondingly referenced.

As seen from FIGS. 9A and 9B, a magnetizing yoke 20 is provided with magnetizing yoke projection portions 20a, 20b, 20c, and 20d and shorting yoke projection portions 21a, 21b, 21c, and 21d which are located between the magnetizing yoke projection portions 20a, 20b, 20c, and 20d respectively. Shorting coils 50a, 50b, 50c, and 50d are wound around the shorting yoke projection portions 21a, 21b, 21c, and 21d respectively. Each of the shorting coils 50a to 50d is formed of at least one turn (preferably, one or two turns).

Figure 10A:
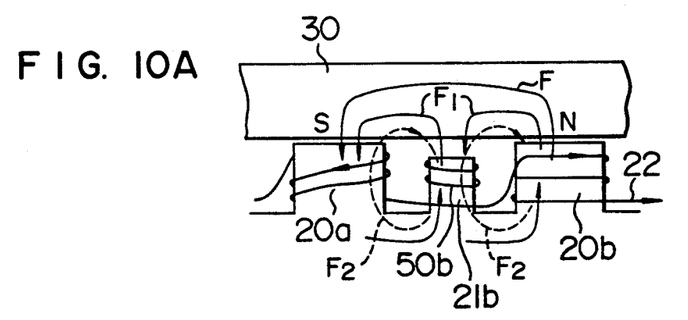
FIGS. 10A and 10B are views for explaining the principle of the magnetization apparatus of FIGS. 9A and 9B.
Figure 10B:
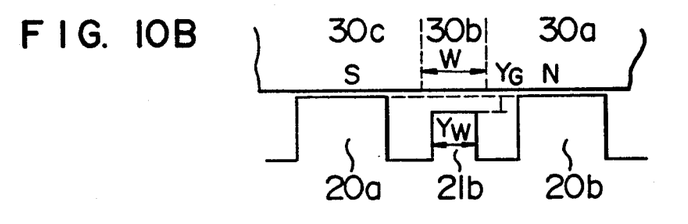

Referring to FIGS. 9A and 9B and FIGS. 10A and 10B, description will be made as to the magnetization method using the magnetization apparatus of FIGS. 9A and 9B. FIG. 10A is a partially enlarged top view showing the magnetization apparatus. First, a switch 28 is instantaneously closed so as to cause a current to flow into a magnetizing coil 22, so that magnetic flux F is generated in the magnetizing yoke projection portions 20a and 20b, and a part $F_1$ of the magnetic flux F passes through the shorting yoke projection portion 21b. Then, a current flows into the shorting coil 50b with a phase delayed by about 90° than the current flowing in the magnetizing coil 22 so as to generate magnetic flux $F_2$ for canceling the magnetic flux $F_1$. Therefore, the magnetic flux $F_1$ and the magnetic flux $F_2$ are canceled with each other in the shorting yoke projection portion 21b, so that only a small quantity of magnetic flux passes through the shorting yoke projection portion 21b. Thus, weak magnetic flux (or non-magnetic flux) regions 30b are provided in portions opposite to the shorting yoke projection portions 21a to 21d as shown in the magnetic field intensity distribution of each of FIGS. 8A to 8C.

The maximum magnetic field intensity $H_m$ and width W Of each of the non-magnetic flux (or weak magnetic flux) regions are determined depending on the resistance value of the shorting coil 50, the width $Y_w$ (FIG. 10B) of the shorting yoke projection portion 21b, the gap value $Y_G$ (FIG. 10B) between the respective top portions of the shorting and magnetizing yoke projection portions, and the like.

Figure 11:
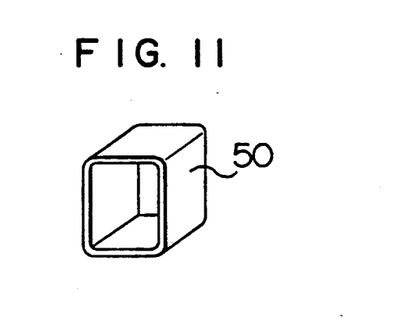
FIG. 11 is a view showing an example of the shorting coil.

That is, the smaller the resistance value of the shorting coil 50, the higher the density of the magnetic flux $F_2$ to be generated, so that the magnetic flux $F_1$ largely canceled to weaken the maximum magnetic field intensity $H_m$ (A/m). That is, the smaller the number of turns of the coil 50 or the smaller the resistivity of the material of the coil 50, the smaller the maximum magnetic field intensity $H_m$. Accordingly, as the shorting coil, it is preferable to use a one-turn copper coil (made of a copper plate) as shown in FIG. 11.

The wider the width $Y_W$ of the shorting yoke projection portion, the wider the width W of the non-magnetic flux (or weak magnetic flux) region.

Further, the larger the gap $Y_G$, the narrower the width W, because the magnetic flux passing through the shorting yoke projection portion is diffused. Accordingly, for example, it is preferable to select the gap $Y_G$ to be 1-2 mm in the case of a permanent magnet to be used in a small-sized electric motor.

Figure 8B:
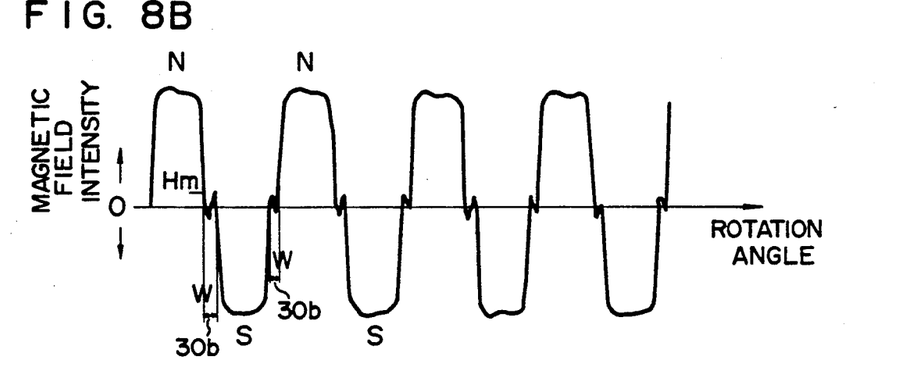
Figure 8C:
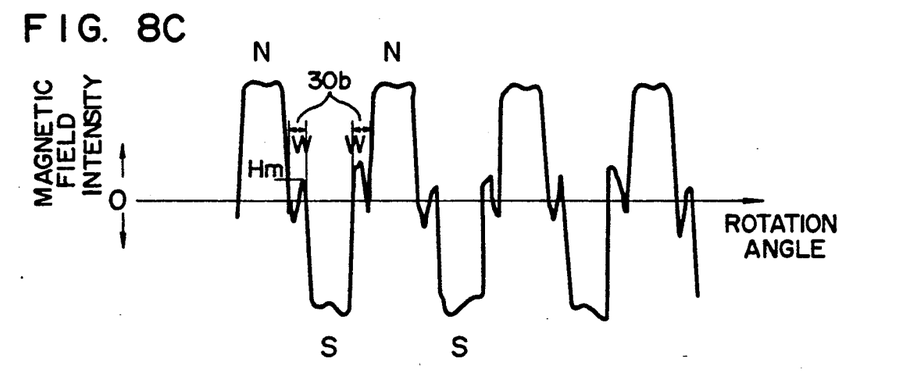

FIG. 8A shows the case in which the resistance value of the shorting coil is larger than that of the shorting coil in the case shown in FIG. 8B, and FIG. 8C shows the case in which the width $Y_W$ is larger or the gap $Y_G$ is smaller than that in the case shown in FIG. 8B.

Figure 12:
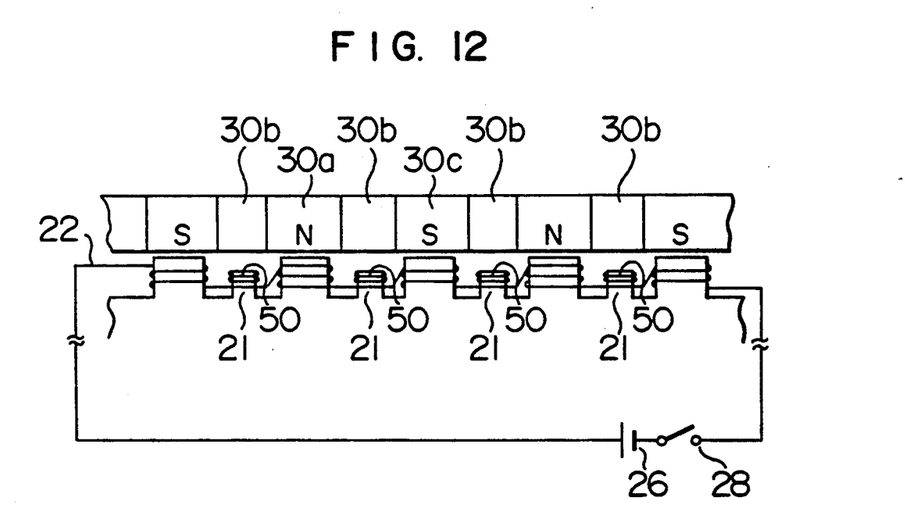
FIG. 12 is another embodiment of the magnetization apparatus according to the present invention.

Although the description has been made as to the case where the permanent magnet according to the present invention is used in an armature of an electric motor in the above embodiment, the use of the permanent magnet is not always limited to such an armature but the permanent magnet may be used for a field system in an electric motor. Further, the present invention is applicable to a linear permanent magnet for use for a linear motor, as shown in FIG. 12.

Although the description has been made as to the case where the permanent magnet magnetization apparatus according to the present invention is used for magnetizing a permanent for use for constituting an armature of an electric motor in the above embodiment, the use of the apparatus according to the invention is not always limited to formation of a permanent magnet for constituting an armature but the apparatus may be used for forming a permanent magnet constituting a field system of an electric motor. Further, the present invention may be applicable to a permanent magnet magnetization apparatus for magnetizing a linear permanent magnet, for example, for use for constituting a linear field system or a linear armature in a linear motor. The magnetization apparatus in this case is illustrated in FIG. 12.

The present invention is not always limited to the cases of the permanent magnets for use in rotary electric motors and linear electric motors and the magnetization apparatus for producing such permanent magnets but applicable to any kind of permanent magnets which are required to have a configuration in which S and N poles are alternately continuously formed through non-magnetic flux (or weak magnetic flux) regions interposed therebetween.

We claim:
1. A magnetization apparatus for magnetizing a permanent magnet comprising:
   a single piece of magnetic material having a plurality of first and second projection portions of magnetic material integrally formed on one surface of said single piece of magnetic material alternately in a row;
   a plurality of third projection portions of magnetic material integrally formed on said one surface of said single piece of magnetic material in a manner so that each of said third projection portions is disposed between corresponding two adjacent ones of said first and second projection portions so that said first, second and third projection portions are alternately located;
   coil means connected to a DC power source through a switch and continuously serially wound around all of said first and second projection portions;
   a plurality of shorting coils respectively correspondingly wound around said third projection portions; and
   said coil means wound on said first projection portions and said coil means wound on said second projection portions being made opposite each other in the direction of winding, so that when an object to be magnetized is disposed in opposition to said one surface of said single piece of magnetic material and said switch is instantaneously closed, one of N and S poles is formed in a domain of said object to be magnetized opposite to each of said first projection portions, the other of N and S poles is formed in a domain of said object to be magnetized opposite to each of said second projection portions, and a non-magnetic flux region or a weak magnetic flux region is formed in a domain of said object to be magnetized opposite to each of said third projection portions.

2. A magnetization apparatus for magnetizing a permanent magnet according to claim 1, in which top portions of said first and second projection portions are made substantially equal in height to each other, while the height of top portions of said third projection portions is made lower than said top portions of said first and second projection portions.

3. A magnetization apparatus for magnetizing a permanent magnet according to claim 1, in which said shorting coil is a one-turn coil.

4. A magnetization apparatus for magnetizing a permanent magnet according to claim 3, in which said shorting coil is formed of a copper plate.

5. A magnetization apparatus for magnetizing a permanent magnet according to claim 1, in which said single piece of magnetic material is cylindrical, and said first, second, and third projection portions are formed on an inner surface of said single piece of magnetic material.

6. A magnetization apparatus for magnetizing a permanent magnet according to claim 1, in which said single piece of magnetic material is shaped like a rectangular prism.

7. A magnetization apparatus for magnetizing a permanent magnet comprising:
  a first magnetic flux generation means provided on one surface of a single piece of magnet material for generating N-pole magnetic flux;
  a second magnetic flux generation means provided adjacently to said first magnetic flux generation means on said one surface for generating S-pole magnetic flux; and
  a third magnetic flux generation means provided between said first and second magnetic flux generation means on said one surface for passing therethrough part of magnetic flux generated by said first and second magnetic flux generation means and for generating magnetic flux for canceling said magnetic flux passing through said third magnetic flux generation means,
  wherein each of said first and second magnetic flux generation means includes coil means connected to a DC power source through a switch, and continuously and serially wound around all of said first and second magnetic flux generation means, said coil means wound around said first magnetic flux generation means being wound in an opposite direction from a direction of winding of said first magnetic flux generation means, and
  said third magnetic flux generation means includes a shorting coil wound therearound.

8. A magnetization apparatus for magnetizing a permanent magnet comprising:
  a plurality of first magnetic flux generation means provided in one row on one surface of a single piece of magnetic material for generating N-pole magnetic flux;
  a plurality of second magnetic flux generation means provided on said one surface for generating S-pole magnetic flux, said plurality of second magnetic flux generation means being located so as to alternate with said plurality of first magnetic flux generation means; and
  a plurality of third magnetic flux generation means each provided between corresponding two adjacent ones of said first and second magnetic flux generation means on said one surface so as to alternate with said first and second magnetic flux generation means, each of said third magnetic flux generation means being for passing therethrough part of magnetic flux generated by said first and second magnetic flux generation means and for generating magnetic flux for canceling said magnetic flux passing through said third magnetic flux generation means,
  wherein each of said first and second magnetic flux generation means includes coil means connected to a DC power source through a switch, and continuously and serially wound around all of said first and second magnetic flux generation means, said coil means wound around said first magnetic flux generation means being wound in an opposite direction from a direction of winding of said first magnetic flux generation means, and
  said third magnetic flux generation means includes a shorting coil wound therearound.

* * * * *